(12) United States Patent
Stannard et al.

(10) Patent No.: US 9,091,547 B2
(45) Date of Patent: Jul. 28, 2015

(54) SIMULATING A TERRAIN VIEW FROM AN AIRBORNE POINT OF VIEW

(75) Inventors: Andrew John Stannard, Preston (GB); Mark Green, Preston (GB); John Snape, St Annes (GB)

(73) Assignee: BAE SYSTEMS PLC, London (GB)

( * ) Notice: Subject to any disclaimer, the term of this patent is extended or adjusted under 35 U.S.C. 154(b) by 163 days.

(21) Appl. No.: 13/699,926

(22) PCT Filed: May 27, 2011

(86) PCT No.: PCT/GB2011/051015
§ 371 (c)(1),
(2), (4) Date: Nov. 26, 2012

(87) PCT Pub. No.: WO2011/148199
PCT Pub. Date: Dec. 1, 2011

(65) Prior Publication Data
US 2013/0063435 A1 Mar. 14, 2013

(30) Foreign Application Priority Data

May 28, 2010 (EP) .................................... 102750569
May 28, 2010 (GB) .................................... 10089506

(51) Int. Cl.
| | |
|---|---|
| *G06T 15/00* | (2011.01) |
| *G01C 21/00* | (2006.01) |
| *G06T 15/20* | (2011.01) |
| *G06T 17/05* | (2011.01) |
| *G09B 9/36* | (2006.01) |

(52) U.S. Cl.
CPC .............. *G01C 21/00* (2013.01); *G06T 15/20* (2013.01); *G06T 17/05* (2013.01); *G09B 9/36* (2013.01)

(58) Field of Classification Search
CPC .......... G01C 21/00; G09B 9/36; G06T 17/05; G06T 15/20
USPC .................... 345/419, 427, 156; 701/14, 120; 340/945
See application file for complete search history.

(56) References Cited

U.S. PATENT DOCUMENTS

| | | |
|---|---|---|
| 5,187,754 A | 2/1993 | Currin et al. |
| 5,566,073 A | 10/1996 | Margolin |

(Continued)

FOREIGN PATENT DOCUMENTS

JP 2008-56046 A 3/2008

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) dated Dec. 13, 2012, issued in corresponding International Application No. PCT/GB2011/051015. (10 pages).

(Continued)

*Primary Examiner* — Phu K Nguyen
(74) *Attorney, Agent, or Firm* — Maine Cernota & Rardin

(57) ABSTRACT

A method of simulating a terrain view from the point of view of an airborne object and a terrain view simulation system which obtain a geo-referenced terrain to the airborne object, correlate in a computer the position and orientation information with the geo-referenced view of the terrain as seen from the airborne object, and display this simulated view.

20 Claims, 2 Drawing Sheets

(56) References Cited

U.S. PATENT DOCUMENTS

| | | | |
|---|---|---|---|
| 5,904,724 A | 5/1999 | Margolin | |
| 5,995,903 A | 11/1999 | Smith et al. | |
| 6,053,736 A | 4/2000 | Huffman et al. | |
| 7,271,740 B2 * | 9/2007 | Fischer | 340/945 |
| 7,437,225 B1 * | 10/2008 | Rathinam | 701/14 |
| 8,355,834 B2 * | 1/2013 | Duggan et al. | 701/24 |
| 8,519,951 B2 * | 8/2013 | Franko et al. | 345/156 |
| 8,538,669 B2 * | 9/2013 | Agarwal et al. | 701/120 |
| 8,693,806 B2 * | 4/2014 | Acree | 382/284 |
| 8,700,298 B2 * | 4/2014 | Meador et al. | 701/120 |

OTHER PUBLICATIONS

International Search Report (PCT/ISA/210) issued on Sep. 16, 2011, by the European Patent Office as the International Searching Authority for International Application No. PCT/GB2011/051015.

European Search Report issued Nov. 12, 2010 for European Application No. 10275056.9.

Great Britain Search Report issued Sep. 28, 2010 for Great Britain Application No. GB1008950.6.

* cited by examiner

SIMULATING A TERRAIN VIEW FROM AN AIRBORNE POINT OF VIEW

FIELD OF THE INVENTION

The present invention relates to method of simulating a terrain view from the point of view of an airborne object. In particular, a terrain view is generated using position and direction information relating to the airborne object, or an aircraft on which the object is mounted, which is correlated with a geo-referenced model of the terrain.

BACKGROUND OF THE INVENTION

Camera pods are often employed on aircraft, and particularly on military aircraft, to provide the pilot and/or co-pilot with terrain views and for reconnaissance purposes. Such camera pods, while extremely useful for such purposes, are very expensive which prevents widespread deployment, and require significant amounts of maintenance as well as having their own power requirements and weight implications.

The lack of such widespread deployment means that many of the advantages of such camera pods cannot be enjoyed by the majority of personnel. For example, while flying at night, a pilot can be presented with an infrared view of the terrain below, assisting in the identification of terrain, landmarks and targets. Furthermore, mission traces can be presented to the pilot and/or co-pilot, which can be quickly correlated with what the pilot can actually see.

Furthermore, in joint-training of aircraft pilots and ground based personnel, it is extremely helpful to display, at ground-level, real-time footage from the point of view of the pilot. This allows the ground based personnel to see what the pilot sees, and to act and advise accordingly.

To date, such real-time footage has been achieved by way of a video stream between the aircraft (transmitting data from the camera pod) and the ground. However, such transmissions require high bandwidth communication links which are costly and whose effectiveness reduces with increasing transmission distance due to signal degradation. In addition, in poor weather conditions such video feeds may be of limited use due to low visibility of the terrain.

SUMMARY OF THE INVENTION

According to a first aspect of the present invention, there is provided a method of simulating to an observer at a location remote from an airborne object a view of a terrain from the airborne object, the method comprising the steps of: obtaining a geo-referenced model of the terrain at the remote location; obtaining position and orientation information relating to the airborne object at the remote location; correlating the position and orientation information with the geo-referenced terrain model and generating a corresponding simulated view, from the airborne object, of the terrain; and displaying the simulated view to the observer at the remote location.

The position and orientation information may be generated at the airborne object and transmitted to the remote location for correlation with the geo-referenced terrain model at the remote location.

Each of the steps may be carried out onboard the airborne object or onboard an aircraft on which the airborne object is mounted. Preferably, the airborne object is a virtual camera pod.

The remote location may be at ground level.

The method may further comprise the steps of: obtaining a geo-referenced model of the terrain at the airborne object; obtaining position and orientation information relating to the airborne object at the airborne object; correlating the position and orientation information with the geo-referenced terrain model and generating said corresponding simulated view of the terrain; and displaying the simulated view to an observer aboard the airborne object or aboard an aircraft on which the airborne object is mounted.

The step of obtaining position and orientation information relating to the airborne object may comprise receiving at said remote location said information via telemetry.

The geo-referenced model obtained at the ground level and the geo-referenced model obtained onboard the airborne object, or aircraft on which the airborne object is mounted, may comprise the same geo-referenced terrain model.

The step of obtaining position and orientation information relating to the airborne object may comprise receiving said information via telemetry. Optionally, said position and orientation information is determined via GPS, LORAN or equivalent.

Alternatively, the step of obtaining position and orientation information relating to the airborne object may comprise the step of detecting the position and orientation of the airborne object, or aircraft on which the airborne object is mounted, at ground level, for example via radar, LIDAR or equivalent.

The position and orientation information relating to the airborne object may be comprised in a viewing frustum representative of a field of view from the airborne object.

Optionally, calculation of the viewing frustum includes the step of determining the position and orientation of the aircraft on which the airborne object is mounted and incorporating an offset between the determined position and orientation of the aircraft and a relative position and viewing direction of a camera pod or a pilot's head.

The step of generating the simulated view may further comprise the step of obtaining moding information relating to the simulated camera pod, said moding information selected from the group comprising infra-red mode, tracking mode, display contrast, display gain and zoom level.

The step of obtaining a geo-referenced model of the terrain preferably comprises correlating aerial images of the terrain with terrain height data.

Optionally, the step of obtaining a geo-referenced model of the terrain comprises incorporating 3D models of objects located in the terrain. Additionally, or alternatively, the step of obtaining a geo-referenced model of the terrain comprises incorporating 3D models of virtual entities in the terrain.

According to a second aspect of the present invention, there is provided a terrain view simulation system for simulating a view from an airborne object to an observer at a location remote from the airborne object, comprising: a geo-referenced terrain model; a first computer; and a first display; wherein the first computer is configured to receive position and orientation information relating to an airborne object at the remote location, correlate the position and orientation information with the geo-referenced terrain model to generate a corresponding simulated view, from the airborne object, of the terrain and output said simulated view to the first display.

The position and orientation information relates to at least one of a simulated camera pod and an aircraft upon which the object is mounted.

The position and orientation information is generated at the airborne object and the first computer is configured to receive a transmission comprising said information for correlation with the geo-referenced terrain model.

The system may comprise a second computer and a second display, said second computer configured to correlate the position and direction information with the geo-referenced terrain model to generate a corresponding simulated view, from the airborne object, of the terrain and output said simulated view to the second display.

The position and orientation information may relate to a simulated camera pod. Alternatively, the position and orientation information may relate to an aircraft upon which the object is mounted.

Preferably, the airborne object, or aircraft upon which the object is mounted, comprises said first computer and said first display.

The geo-referenced terrain model may be common to both the first and second computers such that the generated simulated views are the same.

The system may be configured to interface with the aircraft on which the object is mounted, and to obtain the position and direction information from the aircraft.

The terrain view simulation system preferably further comprises a communication system adapted to communicate said position and orientation information from the airborne object to the second computer.

Alternatively, the terrain view simulation system further comprises a detection and ranging system to determine the position and direction of the airborne object.

The system may further comprise a human computer interface device configured to control parameters of the airborne object, said parameters selected from the group comprising; position, orientation, zoom level, viewing frustum and operational mode settings.

BRIEF DESCRIPTION OF THE DRAWINGS

The present invention will now be described by way of example only and with reference to the accompanying figures in which.

DETAILED DESCRIPTION

Figure 1:
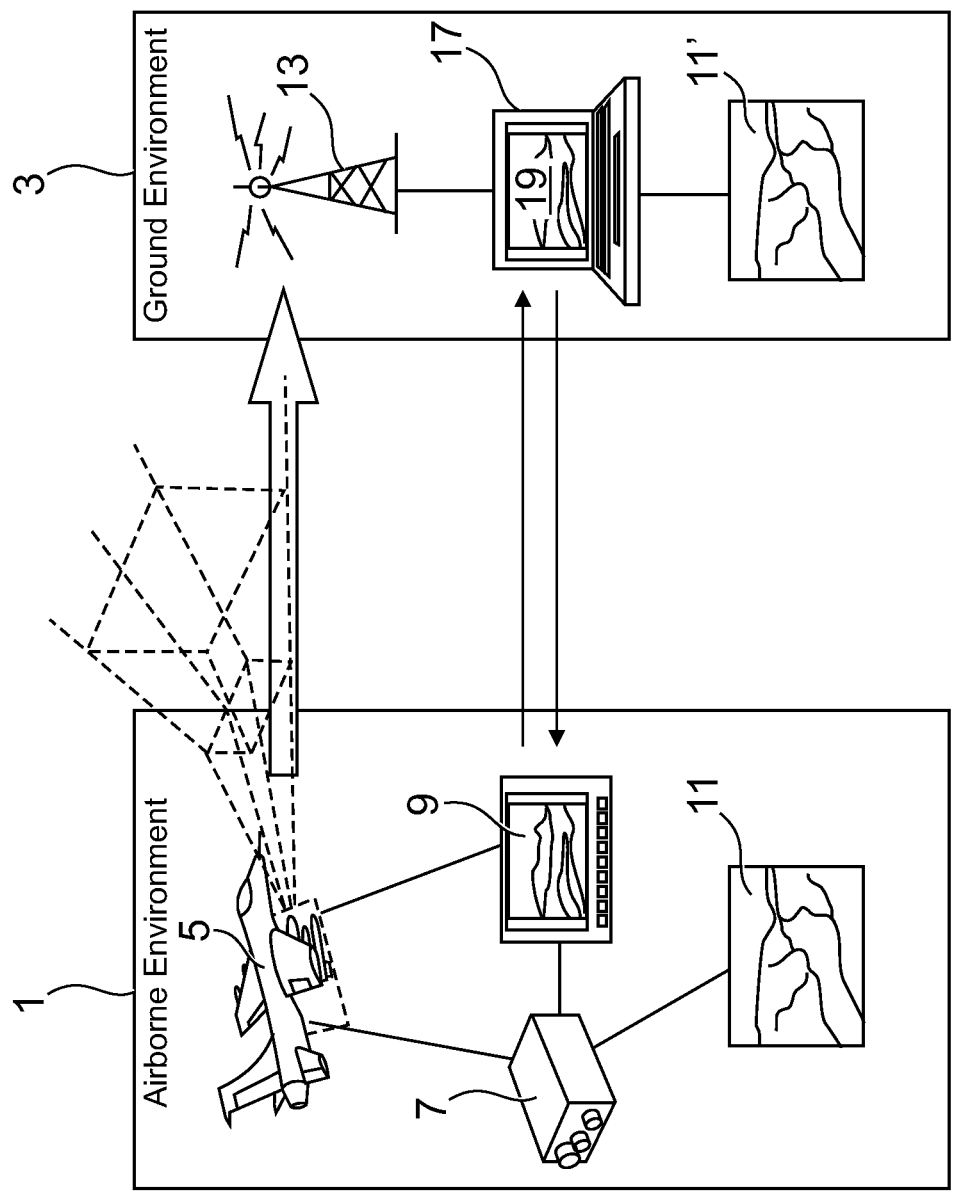
FIG. 1 illustrates in schematic form the use of geo-referenced terrain models in an airborne environment and also a ground-level environment in accordance with an aspect of the present invention.

FIG. 1 presents a schematic view of a terrain view simulation system that functions to present to an observer a view of a terrain from the point of view of an airborne object, in this case a virtual camera pod, as described in detail below.

The system can be thought of as comprising an airborne environment 1 and a ground environment 3. The airborne environment includes an aircraft 5 with an onboard computer 7 and a cockpit display 9 operably connected to the onboard computer 7. A geo-referenced terrain model 11 is stored on the onboard computer 7 or on readable media connected thereto.

The aircraft is capable of determining its own position and orientation and the onboard computer 7, which for example might be a ruggedized PC, is configured to interface with the aircraft's systems so as to obtain this position and orientation information. The position and orientation of a virtual camera pod 6 is then determined using a predetermined position (and optionally orientation) offset.

Additionally, the ground environment 3 includes a receiver 13 which receives the position and orientation information relating to the camera pod 6 via telemetry (shown figuratively by reference numeral 15). This information is relayed to a ground based computer 17 having a connected display 19. Similarly to the onboard computer 7 on the aircraft 5, a geo-referenced terrain model 11' is stored on the ground based computer 17 or on readable media connected thereto.

Both the onboard computer 7 and the ground based computer 17 correlate the position and orientation information relating to the virtual camera pod 6 with the respective geo-referenced terrain models 11,11' to render a simulated view of the terrain from the point of view of the virtual camera pod 6. This simulated view is displayed simultaneously on the cockpit display 9 and on the ground based display 19.

The geo-referenced terrain models 11,11' are common to both the airborne 1 and the ground 3 environments. Accordingly, the simulated views on the cockpit display 9 and the ground based display 19 convey the same information. For practical reasons the actual images displayed may differ in some details (for example there may be overlays presented to the pilot that are not presented to ground based personnel, and vice versa), but the effect is that a ground based observer can view the same image of the terrain that the pilot of the aircraft is presented with in the cockpit.

For low bandwidth operation, it is beneficial that only position and orientation information is transmitted. Conventional systems employ video feeds which not only require a high-bandwidth communications link but additional expensive camera equipment. The present invention can be piggy-backed onto conventional telemetry. Other information that it is beneficial to transmit is so-called moding information; that is, information relating to the operational mode of the virtual camera pod. For example, whether a virtual infra-red mode was on or off, the tracking mode, display contrast and/or gain (to further enhance the correlation between the cockpit display and the ground based display), cross-hair visibility and/or position(s) etc.

It is also beneficial to represent the position and orientation information by a viewing frustum. A viewing frustum is the field of view of a notional camera or observer in three-dimensional space. This information still requires far less bandwidth than a video stream as it can be represented simply, for example, by a field of view angle, aspect ratio and front and back near and far bounding planes.

This also has an added advantage to the rendering process which produces the simulated view of the terrain, because the portions of the geo-referenced model which lie outside the viewing frustum can be removed (or disregarded) and the rendering process carried out only on the portion of the geo-referenced model bounded by the viewing frustum.

Figure 2:
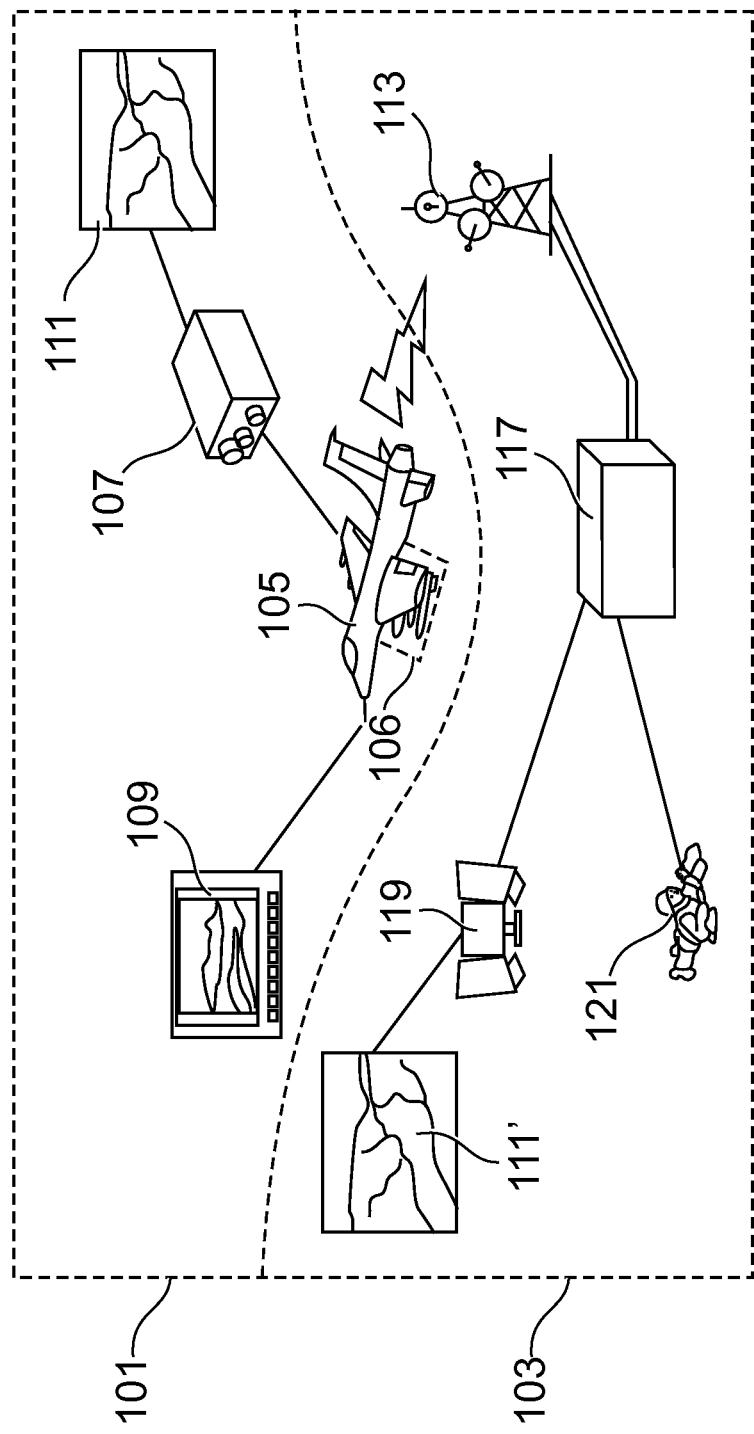
FIG. 2 illustrates in schematic form an exemplary architecture for carrying out the simulation of the view from a virtual camera pod mounted on an aircraft on both a cockpit display and a ground-based display in accordance with an aspect of the present invention.

An example of such a terrain view simulation system which has been demonstrated in practice is described in detail below with reference to FIG. 2.

Again, the system can be thought of as comprising an airborne environment 101 and a ground based environment 103. A Tornado GR4 aircraft 105 was equipped with a ruggedized PC 107 containing a geo-referenced terrain model 111 representative of North-West England, and in particular of the locality of Lytham St Annes for which additional information such as 3D models of buildings in the area were also included.

A ground based visualisation facility (indicated by reference numeral 117) was provided with the same geo-referenced terrain model 111', and a telemetry link 115 via telemetry station 113 to the aircraft 105.

During the above-mentioned demonstration, terrain view simulation software installed on the ruggedized PC 107 generated a real-time simulated view from a virtual camera pod 106 pointed in a direction chosen by the pilot and presented this view to the pilot on cockpit display 109. As the geo-referenced model was based on aerial photography of the area and aforementioned building models, the simulated view corresponded closely with the view that would have been generated by a multi-million pound camera pod pointed in the same direction, but without anywhere near the same associated cost.

At ground level, the position and orientation information was received via telemetry 115 at telemetry station 113. By using the same information as used to generate the simulated view on the cockpit display 109, and the same geo-referenced terrain model 111', the ground based visualisation facility 117 then re-generated, at ground level, a simulated view identical to that being displayed to the pilot on the cockpit display 109. Ground based personnel 121 were thus able to view, in real time, exactly what was being displayed to the pilot (on cockpit display 109) on ground based display 119.

The use of geo-referenced terrain models 111,111' on board the aircraft 105 and at ground level 117 meant that both displays 109,119 were able to show views correlating closely to what would have been achieved had a real camera pod and high-bandwidth communication link been used. This was achieved without expensive equipment (and the associated expensive equipment installation) costs, and making use of conventional telemetry.

Furthermore, conventional camera pods are typically controlled using a small joystick located in the cockpit. In this demonstration, the ruggedized PC was interfaced with the onboard camera pod controls in such a way that not only was the pilot able to control the orientation of the virtual camera pod 16 using the joystick, but the aircraft was unable to distinguish the returning video feed from the ruggedized PC from that which would ordinarily be returned from a real camera pod mounted on the aircraft. This was achieved by simulating to the aircraft the various interfaces and protocols it would expect to see were it communicating with a real camera pod, both in terms of the control output from the aircraft and the data input to the aircraft—effectively replicating a camera pod interface. This also meant that the pilot did not require additional training as to how to use the virtual camera pod.

The system allowed the pilot in the above example to carry out an extremely effective training exercise. Furthermore, ground based personnel 121 were able to take advantage of a ground based display 119, displaying a view which corresponded to the view displayed on the cockpit display 109, to interact with the aircrew and provide training and advice on the basis of the simulated view. Within the simulated view, virtual features such as buildings or tanks etc. can be simulated such that, while the actual terrain may be relatively clear, the view presented to the pilot in the cockpit (and to the ground based personnel) contains targets which can be used for training purposes.

There are numerous benefits obtained, in addition to those discussed in the foregoing description. For example, a pilot can be trained to use a camera pod without necessarily having to fit his aircraft with a real camera pod. This is not only beneficial in terms of the cost saving involved, but it also allows pilots to train in conditions where a real camera pod would be useless. For example, in conditions of extremely poor visibility, a real camera pod may present no useful information to the pilot, whereas a virtual camera pod view can simulate good weather conditions and permit training to continue. The converse is also true; pilots can train to use the camera pod in poor conditions even when the actual weather conditions are good.

It is also envisaged that the geo-referenced model used may not correspond to the actual geographical location in which the aircraft is being flown. This would allow a pilot to train locally for missions etc. in remote locations, and in an actual airborne aircraft rather than in a simulator thus improving realism and the effectiveness of the training exercise. By way of example, the aircraft may be flying over Lytham St Annes but the georeferenced model may relate to a distant region in which a number of hostile targets are located. The pilot may therefore receive training in engaging the hostile targets (presented to him on the cockpit display) without having to leave the relative safety of domestic airspace.

Additionally, weather and other environmental variables may be simulated on the display to give an authentic representation of the target environment, regardless of weather conditions in the training location. For example, it may be daylight with good visibility in the training location, but the pilot will be able to train for a night-time mission in a dusty environment. Conversely again, when actually carrying out a mission at night-time in a dusty environment, target identification and navigation may be assisted by presenting to the pilot a virtualised day-time and clear-sky view of the target area.

It is anticipated, and it will be readily appreciated by the skilled person, that the examples described above in relation to a single aircraft and single ground based display may be extended, for example to multiple aircraft and/or multiple ground stations. It is also anticipated that "ground based" operations could be carried out on naval platforms, such as aircraft carriers or naval command and/or training vessels. This would facilitate coordinated training on large scales with associated cost savings because aircraft would not need to be fitted with expensive camera pods, and existing telemetry systems could be utilised. Furthermore, it is envisaged that a view in one aircraft could be reproduced in another aircraft.

The viewing frustum may be calculated from determination of the position and orientation of the pilot's head (or a virtual position and orientation of a notional pilot's head) in real time. Calculation of the viewing frustum may also take into account an offset between a determined position and orientation of the aircraft and a relative position and orientation of the pilot's head. In either case, the view can be made to correspond to what the pilot is actually looking at rather than just what a virtual camera pod mounted, for example, on the aircraft undercarriage is pointed at.

The position and orientation of the aircraft may be determined by one or more of a number of suitable systems. For example, on board GPS or LORAN may be employed to determine position and/or orientation information on board the aircraft. Alternatively, this information may be determined remotely; for example, via RADAR or LIDAR. Accordingly, a ground based system may be able to simulate the terrain view without the need to receive any information from an aircraft at all.

Note that, for the purposes of the foregoing description and the appended claims, the term "ground level" should not be construed as limited to locations, objects, installations or the like actually on the ground, but to locations, objects, installations or the like where it is desirable to remotely simulate the view from an airborne object (such as an aircraft). As an example, it is possible that the simulation methods described herein may be carried out on a naval platform such as on board a ship or other sea-going vessel. It will be further appreciated that such ground level procedures and processes may equally be carried out on mobile, including airborne, platforms.

Throughout the specification, unless the context demands otherwise, the terms "comprise" or "include", or variations such as "comprises" or "comprising", "includes" or "including" should be understood to imply the inclusion of a stated integer or group of integers, but not the exclusion of any other integer or group of integers.

What is claimed is:

1. A method performed by a computer of simulating views of a terrain from the airborne object, the method comprising:
   obtaining, at the remote location, a first geo-referenced terrain model of the terrain;
   obtaining, at the airborne object, a second geo-referenced model of the terrain;
   obtaining, at the remote location, position and orientation information relating to an airborne object;
   correlating, at the remote location, the position and orientation information with the first geo-referenced terrain model;
   generating at the remote location a corresponding simulated view, from the airborne object, of the terrain at the remote location;
   correlating, at the airborne object, the position and orientation information with the second geo-referenced terrain model and generating said corresponding simulated view of the terrain; and
   simultaneously displaying the simulated view to a first observer at the remote location and displaying the simulated view to a second observer aboard the airborne object or aboard an aircraft on which the airborne object is mounted.

2. The method of claim 1, wherein the position and orientation information is generated at the airborne object, the method comprising:
   receiving the position and orientation information at the remote location for correlation with the first geo-referenced terrain model at the remote location.

3. The method of claim 2, wherein the remote location is at ground level.

4. The method of claim 2, comprising:
   including the position and orientation information relating to the airborne object in a viewing frustum, representative of a field of view from the airborne object;
   transmitted parameters of the frustum comprising a field of view angle, an aspect ratio, and front and back near and far bounding plane, whereby a rendering process is carried out only on a portion of the geo-referenced model bounded by the viewing frustum.

5. The method of claim 4, comprising:
   calculating the viewing frustum by determining the position and orientation of the aircraft on which the object is mounted, and incorporating an offset between the determined position and orientation of aircraft and a relative position and viewing direction of an airborne pilot's head.

6. The method of claim 1, wherein the obtaining, at the remote location, of position and orientation information relating to the airborne object comprises:
   receiving at said remote location said information via telemetry.

7. The method of claim 6, wherein the obtaining of position and orientation information relating to the airborne object, or aircraft on which the object is mounted, comprises:
   detecting the position and orientation of the airborne object, or aircraft on which the object is mounted, at ground level.

8. The method of claim 1, wherein said position and orientation information is determined via GPS or LORAN.

9. The method of claim 1, wherein the generating the simulated view comprises:
   obtaining moding information relating to a virtual camera pod, said moding information being selected from the group consisting of: infra-red mode, tracking mode, display contrast, display gain and zoom level.

10. The method of claim 1, wherein the obtaining of a geo-referenced terrain model of the terrain comprises:
    correlating aerial images of the terrain with terrain height data.

11. The method of claim 1, wherein the obtaining of a geo-referenced terrain model of the terrain comprises:
    incorporating 3D models of objects and/or of virtual entities located in the terrain.

12. The method of claim 1, wherein simulating the views of the terrain comprise:
    at least one virtual camera pod on the aircraft interfacing with a pre-existing joystick on the aircraft, wherein interfaces and protocols of the virtual camera pod replicate a physical camera pod interface and protocols including control output from the aircraft and data input to the aircraft, whereby the virtual camera pod is indistinguishable to avionics of the aircraft from a physical camera pod, and pilot training as to how to use the virtual camera pod is eliminated.

13. A terrain view simulation system for simulating views of a terrain from an airborne object comprising:
    a first geo-referenced model of the terrain;
    a first computer;
    a first display at the remote location;
    a second geo-referenced model of the terrain;
    a second computer;
    a second display aboard the airborne object or aboard an aircraft on which the airborne object is mounted; wherein
    the first computer is configured to receive, at the remote location, position and orientation information relating to an airborne object; to correlate the position and orientation information with the first geo-referenced terrain model to generate a corresponding simulated view, from the airborne object, of the terrain; and
    to output said simulated view to the first display;
    the second computer is configured to:
    receive the position and orientation information relating to the airborne object;
    correlate the position and direction information with the second geo-referenced terrain model to generate said corresponding simulated view, from the airborne object, of the terrain;
    output said simulated view to the second display; and
    the first and second displays are configured to simultaneously display the simulated view to a first observer at the remote location and a second observer aboard the airborne object or aboard an aircraft on which the airborne object is mounted.

14. The system of claim 13, wherein the position and orientation information relates to at least one of a simulated camera pod and an aircraft upon which the object is mounted.

15. The system of claim 13, wherein the position and orientation information is generated at the airborne object, the first computer being configured to receive a transmission comprising said information for correlation with the first geo-referenced terrain model.

16. The system of claim 13, comprising:
    an interface for interfacing an aircraft on which the object is mounted, and to obtain the position and direction information from the aircraft.

17. The system of claim 13, comprising:
a communication system adapted to receive communication of said position and orientation information from the airborne object to the first computer.
18. The system of claim 13, comprising:
a detection and ranging system to determine the position and direction of the airborne object.
19. The system of claim 13, comprising:
a human computer interface device at the airborne object configured to control parameters of the airborne object, said parameters selected from the group consisting of: position, orientation, zoom level, viewing frustum and operational mode settings.
20. The system of claim 13, comprising:
a plurality of virtual camera pods operating on a plurality of aircraft;
a plurality of ground stations;
wherein the same simulated views are simultaneously displayed on the plurality of aircraft and the plurality of ground stations;
wherein the simulated view is a virtualized view; and
wherein the virtualized view does not correspond to an actual geographic location of the aircraft, whereby training exercises are conducted.

\* \* \* \* \*